Jan. 4, 1927.

H. B. TABOR 1,613,488

CHART

Filed April 10, 1923

INVENTOR

Harry B Tabor
By his Attorney

Patented Jan. 4, 1927.

1,613,488

UNITED STATES PATENT OFFICE.

HARRY B. TABOR, OF EVERETT, MASSACHUSETTS.

CHART.

Application filed April 10, 1923. Serial No. 631,054.

This invention relates to charts, and it has for its chief object to devise a chart on which a record of an individual salesman, sales department, or the like, can be kept up to date constantly with a minimum of labor, and from which a salesman or manager can see at a glance the result of any day's work and compare it with previous days or with a suitable standard. The preferred embodiment of the invention comprises a chart which not only gives a daily record of sales, but includes the debit and credit items necessary to enable the salesman or manager to determine daily, and with a minimum of effort, the exact status of the work or account of that particular salesman, sales department, or the like.

The nature of the invention will be readily understood from the following description when read in connection with the accompanying drawing, and the novel features will be particularly pointed out in the appended claims.

The single figure of the accompanying drawing is a plan view of a chart embodying a preferred form of the invention.

The invention will be herein disclosed as embodied in a chart designed especially with reference to the requirements of the retail milk business, it being understood, however, that the same general principles are applicable to charts designed for use in other lines of business, particularly in connection with bakeries, laundries, the retail ice business, and the like.

The chart shown preferably is printed on a relatively heavy piece of paper of rectangular outline, as indicated at 2, and it includes a circular area enclosed within the circumference 3. This area is divided by means of a series of concentric circles into a series of annular areas or sections designated, respectively, by the numerals 4 to 16 inclusive. This entire circular area is again divided by heavy radial lines 17 into 32 approximately equal segmental sections or spaces. Each of these spaces, except one, are intended for the entry of items relating to an individual day's business, and the days of the month are designated by numbers located in the marginal space 4 opposite the respective segmental sections. The remaining section or space contains headings or captions designating the nature of the entries to be made in the annular areas. In the present instance these headings consist of the following words or abbreviations for them:

Merchandise, in area 6; Debit transfer, in area 7; Cash, in area 8; Profit & loss, in area 9; Allowances, in area 10; Credit transfers, in area 11; Wholesale, in area 12; Retail, in area 13; Total, in area 14; Average, in area 15; and Check, in area 16.

The caption for the annular areas 12 and 13 also contain the words "High average", designating the highest average previously made by the salesman whose record is charted.

The day spaces or sections are each divided by lines, such as those indicated at 18, into four sub-divisions and the symbols F, S, T and A are located in the marginal space 5 opposite the respective sub-divisions for each day, these symbols standing, respectively, for Forward, Score, Total and Average. It should be noted that the lines 18 extend only through the annular sections 5 to 12 inclusive and do not sub-divide the innermost areas 13 to 16 inclusive.

In using this chart the merchandise sold each day is entered in the annular section 6 as the score for that day, this entry being in money value. The volume of the sales is also entered in sections 12 and 13 in "points", the wholesale entry being made in section 12 and the retail entry in section 13. Any debit transfers, cash received, loss incurred, allowances and credit transfers for the day are all entered in the score space and under the proper captions for that particular day. Considering, for example, the entries made for the third day, it will be observed that the money value of the merchandise brought forward from the previous day is $101.59½; the cash item brought forward is $471.43; the allowance item brought forward is $5.20, and the credit transfer item brought forward is $46.13. The total previous wholesale sales in points is 79. On this particular day the sales in money value were $49.24; the cash taken in $24.31; the allowances made $2.60; and the wholesale and retail sales in points are 36 and 247, respectively. Adding this day's score to the items brought forward gives totals to date of $150.83½ for merchandise; $495.74 for cash; $7.80 for allowances; $46.13 for credit transfers; 115 points for wholesale sales, and 731 points for retail sales. This gives an average of 38 points for wholesale sales on this day and 243 points for retail sales. The averages for the cash items can also be entered if desired, but in this particular business this usually is not desirable. The retail sales points appearing in section 13 for any day are added to the total for the previous day, and divided by the number of days to determine the average which appears in section 15.

The point system has been adopted rather generally for the purpose of scoring. In wholesale sales, one quart of milk is equivalent to 1 point, an 8½ quart can of milk or cream equals 5 points, and any package of cream in bottles is 1 point. In retail sales, a quart of milk is equal to 1 point, a quart of cream equals 4 points, and a half pint cream equals 1 point. Any other suitable scoring system may, however, be adopted.

It may here be explained that credit and debit transfers in this particular business cover transfers from one route to another. The profit and loss column shows losses due to bad bills and the like; the allowance column shows allowances or concessions made to customers, or special prices made to them. It will be observed that all the essential debit, credit, and record items may be conveniently entered each day and added to the previous day's total to give a new total which is carried forward to the next day. This applies to all the items in sections 6 to 12 inclusive. The retail sales in points are handled slightly different, as above described. It should also be observed that the caption section in areas 12 and 13 show the highest previous average for both retail and wholesale sales made by the salesman. In the particular example shown, the highest previous wholesale average was 59 points, and the highest previous retail average 240 points. Consequently, a sales manager or other official looking at this record can see at a glance exactly what this salesman has done for any individual day in the month charted, and he can compare the results with this salesman's previous high records. At the end of the month the totals are carried forward on the next month's chart and entered in an audit summary, shown at the top of the chart at 20. The high averages also are entered in the space next below the captions on the chart for the new month.

Assuming that the proprietor or manager of the business wishes to determine the condition of the business on an individual route on any day, he would first collect the debits shown in the chart, consisting of the balance at the close of the previous month, found in the audit summary at the top of the chart, and add this to the entries under merchandise and debit transfers for the day in question. He would then get together his credits, consisting of the items under cash, profit & loss, allowances, and credit transfers. The total of these credit items would be deducted from the total debits, enabling him to see whether or not a salesman had increased or decreased these debits.

The retail and wholesale totals in collections are entered in the space at the center of the circular portion of the chart. If these figures are above the previous averages they preferably are entered in green ink, while if they are below they are entered in red ink, so that a person familiar with the system would readily recognize the trend of this particular salesman's work. It is contemplated, also, that the salesman would be required to check each day's entries by entering his initials in the spaces in section 16 so that his record will be put before him daily.

The triangular spaces 21, 22, 23 and 24, respectively, may conveniently be used to enter records such as cash shortage, errors in billing, merchandise shortage, and ledger adjustments, which items should be noted to complete the month's record.

The charts preferably are made of convenient size so that they may be filed or bound in a binder of the loose leaf type, where they will afford a permanent record of the work of each salesman, and they may finally be used in making up the yearly audit. The chart thus provides a very convenient and compact record, giving all the items essential to enable the manager to see clearly the exact condition both of the salesman's account at any time, and also of his record for any individual day.

It will be understood, of course, that certain changes may be necessary in the chart to adapt it for other lines of business, and that such changes may be made without departing from the spirit or scope of this invention.

Having thus described my invention, what I desire to claim as new is:

1. A chart of the character described comprising a series of concentric circles spaced apart to provide a series of annular areas between them, a series of radial lines spaced apart by substantially uniform distances and dividing said areas into a series of segmental spaces corresponding to a series of days, marginal numbers designating said day, and captions in said areas designating the nature of the items to be entered in said areas.

2. A chart of the character described comprising a series of concentric circles spaced apart to provide a series of annular areas between them, a series of radial lines spaced apart by substantially uniform distances and dividing said areas into thirty-two substantially equal segmental spaces, marginal numbers opposite thirty-one of said spaces designating the days of the month, captions in the remaining space designating the nature of the items to be entered in said areas, a series of radial lines dividing said segmental spaces into sub-divisions, and marginal symbols opposite said sub-divisions to designate the character of the entries to be made in said sub-divisions.

3. A chart of the character described having a circular area thereon with a series of concentric circles dividing said area into a series of annular areas, a series of radial lines dividing said circular area into thirty-two substantially equal segmental spaces, captions in one of said segmental spaces designating debit, credit, and volume items to be entered in said areas, marginal numbers opposite the remaining segmental spaces designating the days of the month, a series of radial lines dividing said segmental spaces into sub-divisions, and marginal symbols opposite said sub-divisions designating the items brought forward, the day score and the total.

4. A chart of the character described having a circular area thereon with a series of concentric circles dividing said area into a series of annular areas, a series of radial lines dividing said annular areas into a series of segmental spaces corresponding to a series of days covering a given period of time, marginal numbers designating said days, captions in said areas designating the nature of the items to be entered in said areas, and an audit summary on said chart adjacent to said circular area and containing headings and spaces for the entrance of items summarizing the previous record for a period of time corresponding to that covered by the record made in said circular area.

HARRY B. TABOR.